(12) United States Patent
Yamada et al.

(10) Patent No.: US 9,134,806 B2
(45) Date of Patent: Sep. 15, 2015

(54) MOBILE TERMINAL DEVICE, STORAGE MEDIUM AND DISPLAY CONTROL METHOD

(71) Applicant: KYOCERA Corporation, Kyoto-shi, Kyoto (JP)

(72) Inventors: Seiji Yamada, Daito (JP); Yoshihiko Inaoka, Daito (JP)

(73) Assignee: Kyocera Corporation, Kyoto (JP)

( * ) Notice: Subject to any disclaimer, the term of this patent is extended or adjusted under 35 U.S.C. 154(b) by 80 days.

(21) Appl. No.: 13/713,604

(22) Filed: Dec. 13, 2012

(65) Prior Publication Data

US 2013/0147717 A1    Jun. 13, 2013

(30) Foreign Application Priority Data

Dec. 13, 2011    (JP) .................. 2011-272824

(51) Int. Cl.
*G06F 3/02*    (2006.01)
(52) U.S. Cl.
CPC ....................... *G06F 3/02* (2013.01)
(58) Field of Classification Search
None
See application file for complete search history.

(56) References Cited

U.S. PATENT DOCUMENTS

| 2005/0114788 | A1* | 5/2005 | Fabritius | 715/767 |
| 2010/0207897 | A1* | 8/2010 | Ono | 345/173 |
| 2011/0032190 | A1 | 2/2011 | Takarabe | |
| 2011/0214053 | A1* | 9/2011 | Scott et al. | 715/259 |
| 2011/0267278 | A1* | 11/2011 | Wickstrom | 345/173 |

FOREIGN PATENT DOCUMENTS

| JP | 2010-263433 A | 11/2010 |
| JP | 2011-034476 A | 2/2011 |

OTHER PUBLICATIONS

Notification of Reasons for Refusal dated Dec. 24, 2014 issue for counterpart Japanese application No. 2011-272824.

* cited by examiner

*Primary Examiner* — Kathy Wang-Hurst
*Assistant Examiner* — Peijie Shen
(74) *Attorney, Agent, or Firm* — Procopio, Cory, Hargreaves & Savitch LLP (57) ABSTRACT

A mobile terminal device includes: a display surface; a display control module that displays on the display surface a first input screen with a plurality of character keys which input characters and a second input screen having larger intervals between at least some of adjacent character keys than intervals between all of adjacent character keys of the first input screen, in a switchable manner between the two input screens; and a delete key for deleting a character input by the character key. In this arrangement, the display control module executes control for changing the first input screen to the second input screen based on fulfillment of a condition for changing including deletion of a character by the delete key when the first input screen is displayed on the display surface.

6 Claims, 7 Drawing Sheets

FIG. 7B

MOBILE TERMINAL DEVICE, STORAGE MEDIUM AND DISPLAY CONTROL METHOD

This application claims priority under 35 U.S.C. Section 119 of Japanese Patent Application No. 2011-272824 filed on Dec. 13, 2011, entitled "MOBILE TERMINAL DEVICE, PROGRAM AND DISPLAY CONTROL METHOD." The disclosure of the above application is incorporated herein by reference.

BACKGROUND OF THE INVENTION

1. Field of the Invention

The present invention relates to cellular phones, personal digital assistants (PDAs), tablet PCs, mobile terminal devices such as electronic book terminals, storage media holding computer programs preferably for use in the mobile terminal devices, and display control methods preferably used in the mobile terminal devices.

2. Disclosure of Related Art

In recent years, there are an increasing number of mobile terminal devices with touch panels, instead of operation keys.

Generally, a touch panel-type mobile terminal device with an acceleration sensor allows the display direction of a screen on the touch panel to be changed in a user-friendly manner, depending on the orientation of the device main body held by a user with respect to the ground.

On a mobile terminal device with a touch panel, a user can select one of a plurality of keyboards different in key layout and display the selected keyboard on the screen. The keyboard displayed on the screen is decided in size and shape depending on the aspect ratio of the screen.

For example, a QWERTY keyboard has a larger number of keys arranged in the horizontal direction than those arranged in the vertical direction. Accordingly, when the screen is in portrait orientation, there are extremely small intervals between keys horizontally adjacent to each other. In such a state, a user may be likely to perform incorrect input by pressing wrong keys.

Accordingly, it is desired to take preventive measures on a mobile terminal device on which a keyboard is displayed in various forms so as to avoid occurrence of repeated incorrect input depending on the display form of the keyboard.

SUMMARY OF THE INVENTION

A mobile terminal device according to a first aspect of the present invention includes: a display surface; a display control module which displays on the display surface a first input screen with a plurality of character keys which input characters and a second input screen having larger intervals between at least some of adjacent character keys than intervals between all of adjacent character keys of the first input screen, in a switchable manner between the two input screens; and a delete key which deletes a character input by the character key. In this arrangement, the display control module executes control for changing the first input screen to the second input screen based on fulfillment of a condition for changing including deletion of a character by the delete key when the first input screen is displayed on the display surface.

A second aspect of the present invention relates to a storage medium which holds a computer program applied to a mobile terminal device. The mobile terminal device includes a display surface and an acceptance module which accepts an input to the display surface. The computer program provides a computer of the mobile terminal device with a function of changing a first input screen with a plurality of character keys for inputting characters to a second input screen with larger intervals between at least some of adjacent character keys than intervals between all of adjacent character keys of the first input screen based on fulfillment of a condition for changing including deletion of a character by a delete key for deleting a character input by the character key when the first input screen is displayed on the display surface.

A third aspect of the present invention relates to a display control method in a mobile terminal device with a display surface. The display control method according to this aspect includes the steps of: displaying a first input screen with a plurality of character keys which input characters; and changing the first input screen to a second input screen with larger intervals between at least some of adjacent character keys than intervals between all of adjacent character keys of the first input screen based on fulfillment of a condition for changing including deletion of a character by a delete key which deletes a character input by the character key when the first input screen is displayed.

BRIEF DESCRIPTION OF THE DRAWINGS

The foregoing and other objectives and novel features of the present invention will be more fully understood from the following description of preferred embodiments when reference is made to the accompanying drawings.

However, the drawings are only for illustration and are not intended to limit the scope of the present invention.

DESCRIPTION OF PREFERRED EMBODIMENTS

An embodiment of the present invention will be described below with reference to the drawings.

In this embodiment, a touch sensor corresponds to an "acceptance module" recited in the claims. A CPU 100 corresponds to a "display control module" recited in the claims. However, the foregoing correspondence between the claims and the description of the embodiment is merely one example and does not limit the claims to the embodiment.

Figure 1A:
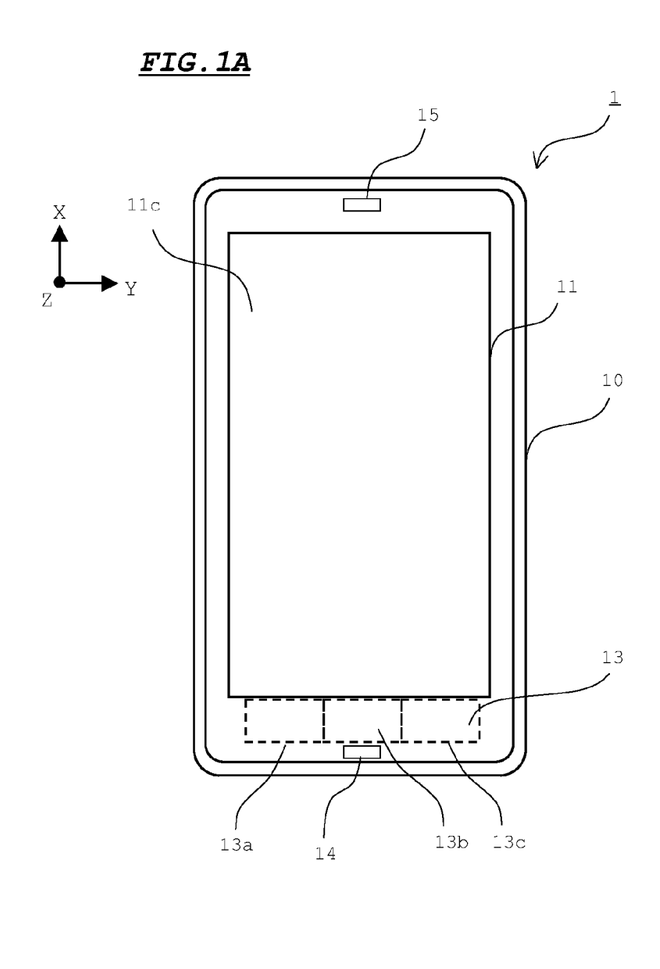
FIGS. 1A and 1B are diagrams showing an outer configuration of a cellular phone according to an embodiment of the present invention.
Figure 1B:
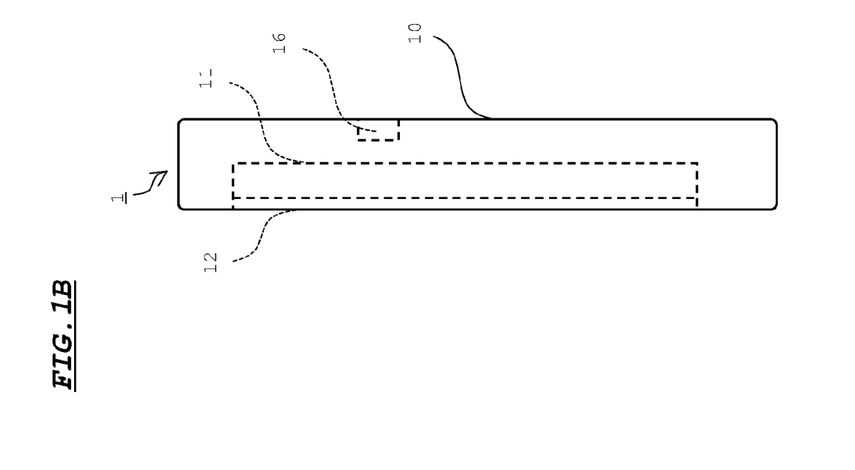

FIGS. 1A and 1B are diagrams showing an outer configuration of a cellular phone 1. FIGS. 1A and 1B are a front view and a side view, respectively.

The cellular phone 1 has a rectangular cabinet 10 with a small thickness. The cabinet 10 has a touch panel on a front side thereof. The touch panel includes a display 11 and a touch sensor 12 laid on the display 11.

Figure 2:
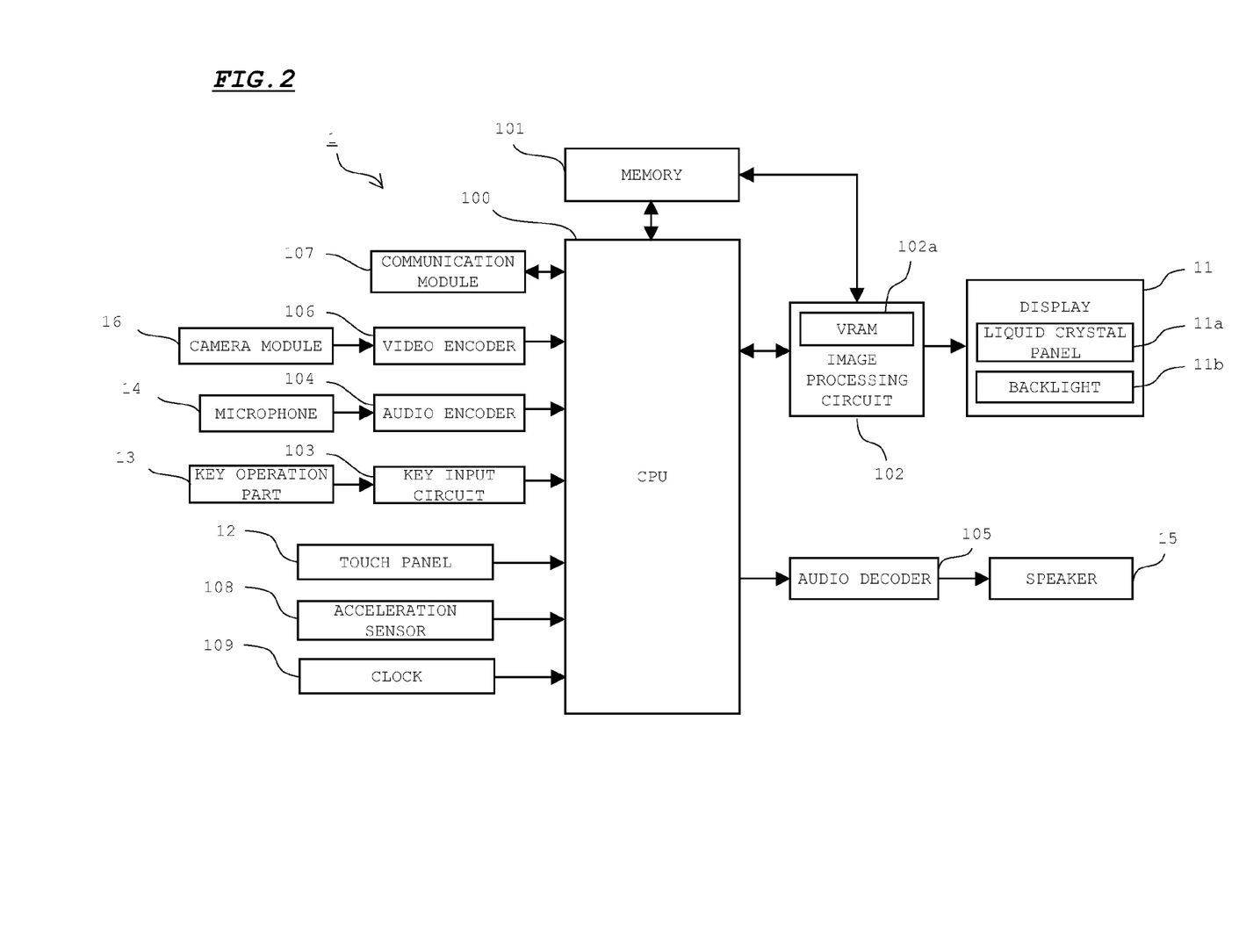
FIG. 2 is a block diagram showing an entire configuration of the cellular phone according to the embodiment.

The display 11 is formed by a liquid crystal panel 11a and a backlight 11b illuminating the liquid crystal panel 11a (refer to FIG. 2). The liquid crystal panel 11a has a display surface 11c for displaying images, and the display surface 11c is exposed to outside. The display surface 11c displays a home screen with a large number of icons for application programs (hereinafter, abbreviated as "applications") and an execution screen according to the application. Any other display element such as organic EL may be used instead of the liquid crystal panel 11a.

The touch sensor 12 is arranged on the display surface 11c. The touch sensor 12 is formed as a transparent sheet, and a user can see the display surface 11c through the touch sensor 12. The touch sensor 12 detects a position (hereinafter, referred to as "input position") of contact by a user on the display surface 11c, and outputs a position signal corresponding to the input position to a CPU 100 described later. Contacting the display surface 11c actually refers to contacting a region on a surface of a cover covering the touch sensor 12 corresponding to the display surface 11c.

The touch sensor 12 is a capacitance-type touch sensor which includes first transparent electrodes and second transparent electrodes aligned in a matrix, and a cover. The touch sensor 12 detects an input position by sensing a change in capacitance between the first transparent electrodes and the second transparent electrodes.

The touch sensor 12 is not limited to a capacitance-type touch sensor, and may be any other touch sensors of ultrasonic type, pressure-sensitive type, resistance-film type, light-detecting type, or the like.

The user can perform various operations such as touching, tapping, flicking, or the like, by contacting the display surface 11c with the use of his/her finger or a contact member such as a pen, etc (hereinafter, referred to as simply "finger").

The touch panel has a key operation part 13 at a lower part thereof. The touch keys 13a to 13c specifically refer to a home key 13a, a setting key 13b and a back key 13c. The home key 13a is a key for displaying a home screen on the display surface 11c. The setting key 13b is a key for displaying a setting screen for making various settings on the display surface 11c. The back key 13c is a key for returning the screen to be displayed on the display surface 11c to the previous screen on execution of an application.

The cabinet 10 has on a front side thereof a microphone 14 at a lower part and a speaker 15 at an upper part. The user can conduct communications by listening to voices of a conversational partner from the speaker 15 and letting out his/her voices to the microphone 14.

The cabinet 10 has a camera module 16 on a back surface side thereof. The cabinet 10 has on a back surface thereof a lens window from which an image of a subject is taken into the camera module 16.

FIG. 2 is a block diagram showing an entire configuration of the cellular phone 1. In addition to the foregoing components, the cellular phone 1 in this embodiment includes the CPU 100, a memory 101, an image processing circuit 102, a key input circuit 103, an audio encoder 104, an audio decoder 105, an image encoder 106, a communication module 107, an acceleration sensor 108 and a clock 109.

The image processing circuit 102 generates images to be displayed on the display 11 according to control signals input from the CPU 100, and stores image data in a VRAM 102a.

The image processing circuit 102 outputs image signals containing the image data stored in the VRAM 102a, to the display 11. The image processing circuit 102 also outputs control signals for controlling the display 11 to turn on or off the backlight 11b of the display 11. Accordingly, light emitted from the backlight 11b is modulated by the liquid crystal panel 11a according to the image signals, whereby the images are displayed on the display surface 11c of the display 11.

The key input circuit 103, when any key of the key operation part 13 is pressed, outputs a signal corresponding to the pressed key to the CPU 100.

The audio encoder 104 converts audio signals output from the microphone 14 according to collected sounds, into digital audio signals, and outputs the signals to the CPU 100.

The audio decoder 105 subjects the audio signals from the CPU 100 to a decoding process and D/A conversion, and outputs the converted analog audio signals to the speaker 15.

The communication module 107 includes an antenna transmitting and receiving radio waves for telephone calls and telecommunications. The communication module 107 converts signals input from the CPU 100 into radio signals, and transmits the converted radio signals via the antenna to the other end of communications such as a base station or another communication device, etc. The communication module 107 also converts the radio signals received via the antenna into signals in a form that allows the CPU 100 to utilize the signal, and outputs the converted signals to the CPU 100.

The acceleration sensor 108 detects acceleration of the cellular phone 1. The acceleration sensor 108 is a triaxial acceleration sensor which detects acceleration generating in three X-axis, Y-axis and Z-axis directions shown in FIG. 1A. The acceleration sensor 108 outputs an acceleration signal corresponding to the detected acceleration to the CPU 100. When the cellular phone 1 is in a stationary state, gravity acceleration of the cellular phone 1 is detected by the acceleration sensor 108.

The clock 109 measures time and outputs a signal corresponding to the measured time to the CPU 100.

The memory 101 includes a ROM and a RAM. The memory 101 stores a control program for providing the CPU 100 with control functions, and various applications. In addition, the memory 101 is also used as a working memory for storing various kinds of data temporarily used or generated during execution of an application.

The CPU 100 controls components such as the camera module 16, the microphone 14, the communication module 107, the display 11, and the speaker 15, according to the control programs, thereby to execute various applications for phone calls, camera functions, e-mails, web browsers, maps, music players, and the like.

The CPU 100 detects whether the cellular phone 1 is in landscape or portrait orientation with respect to the ground, according to the acceleration signal from the acceleration sensor 108.

FIGS. 3A to 3D are diagrams for describing a display direction of a screen on the display 11 with change in posture of the cellular phone 1.

Figure 3A:
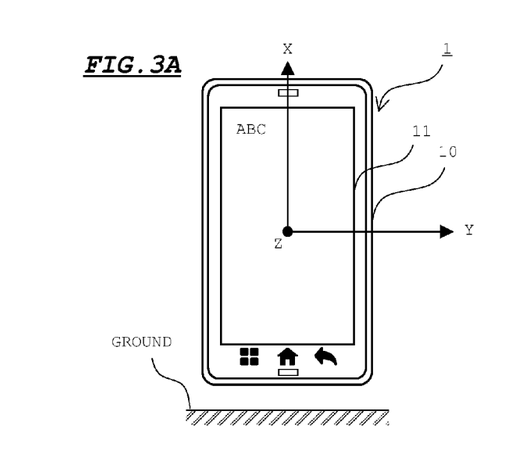
FIGS. 3A to 3D are diagrams for describing display directions of a screen on a display with changes in posture of the cellular phone according to the embodiment.

As shown in FIG. 3A, when the cellular phone 1 is in portrait orientation, a longer side of the cellular phone 1 is placed in an up-down direction. At that time, a display direction of a screen (image) on the display 11 with respect to the cellular phone 1 is made along the longer side. Meanwhile, as shown in FIG. 3C, when the cellular phone 1 is in landscape orientation, a shorter side of the cellular phone 1 is placed in the up-down direction. At that time, a display direction of a screen (image) on the display 11 with respect to the cellular phone 1 is made along the shorter side.

Figure 3B:
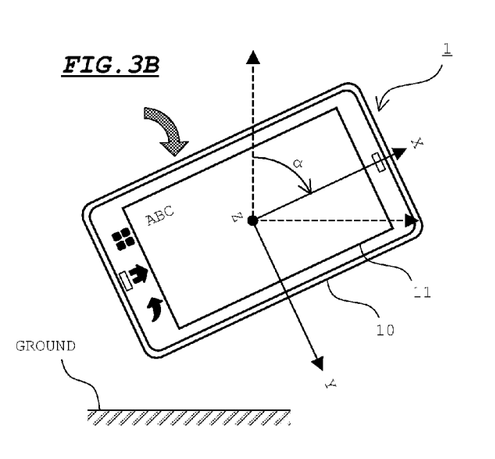
Figure 3C:
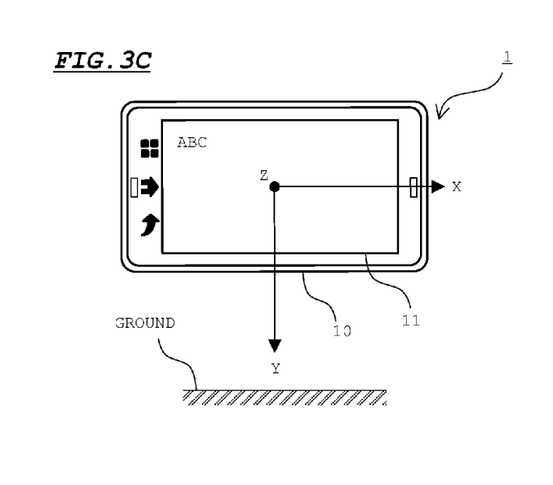

When the cellular phone is inclined so as to change from portrait to landscape orientations and an angle of inclination reaches an angle α (vertical critical angle α) as a threshold value as shown in FIG. 3B, the CPU 100 detects that the cellular phone 1 is switched to landscape orientation. Based on the result of the detection, a display direction of a screen (image) on the display 11 with respect to the cellular phone 1 is made along the shorter side, as shown in FIG. 3B.

Figure 3D:
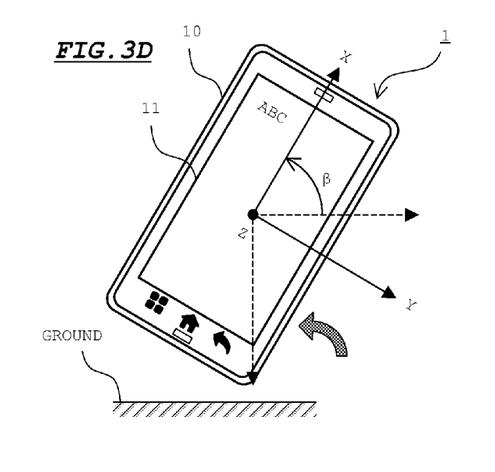

When the cellular phone 1 is inclined so as to change from landscape to portrait orientations and an angle of inclination reaches an angle β (vertical critical angle β) as a threshold value as shown in FIG. 3D, the CPU 100 detects that the cellular phone 1 is switched to portrait orientation. Based on the result of the detection, a display direction of a screen (image) on the display 11 with respect to the cellular phone 1 is made along the longer side, as shown in FIG. 3D.

The display 11 has a rectangular shape. When the cellular phone 1 is in portrait orientation, a screen displayed on the display 11 is vertically long, and when the cellular phone 1 is in landscape orientation, a screen displayed on the display 11 is horizontally long.

Hereinafter, the display form of a screen on the cellular phone 1 in portrait orientation will be referred to as portrait screen display, and the display form of a screen on the cellular phone 1 in landscape orientation will be referred to as landscape screen display. In addition, the display direction of a screen in portrait screen display will be referred to as portrait orientation, and the display direction of a screen in landscape screen display will be referred to as landscape orientation.

On the cellular phone 1, a keyboard is displayed on a screen (hereinafter, referred to as "character input screen") for inputting characters such as an e-mail text creation screen. A user can input a desired text by operating the keyboard. In addition, a user can select a keyboard depending on a desired input mode from a plurality of keyboards including QWERTY keyboards, and arrange the selected keyboard on the character input screen.

Figure 4A:
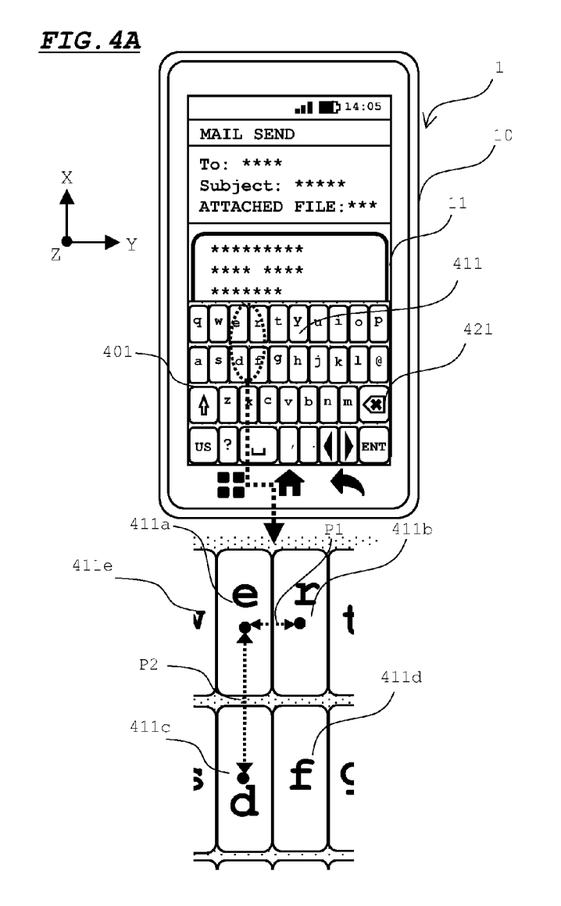
FIGS. 4A and 4B are diagrams of QWERTY keyboards on the display of the cellular phone according to the embodiment.
Figure 4B:
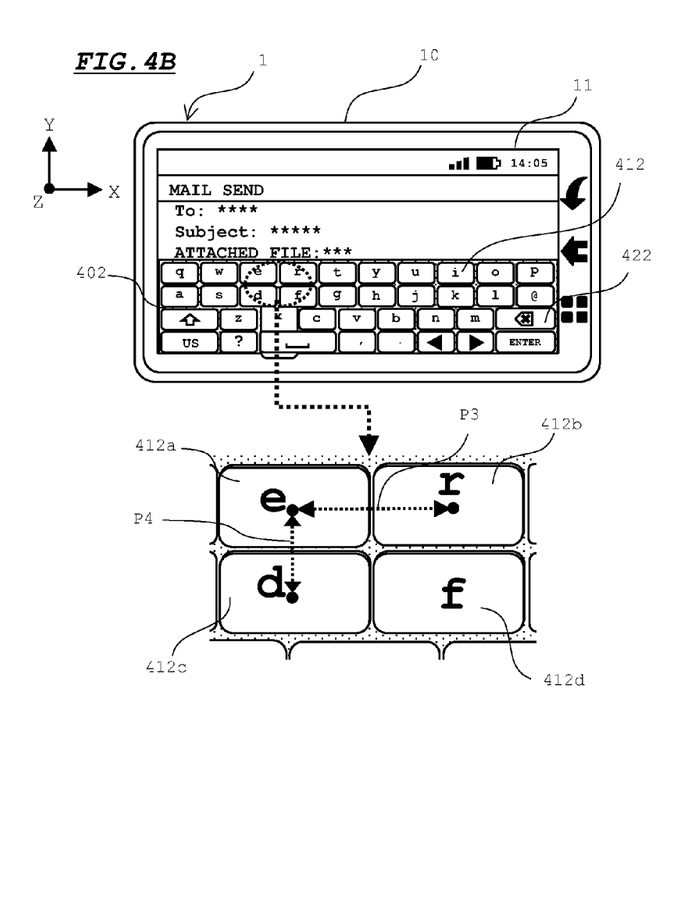

FIGS. 4A and 4B are diagrams of QWERTY keyboards 401 and 402 on the display 11 of the cellular phone 1 according to the embodiment. FIG. 4A shows a state where the QWERTY keyboard 401 is displayed in portrait screen display. FIG. 4B shows a state where the QWERTY keyboard 402 is displayed in landscape screen display. FIGS. 4A and 4B show adjacent keys 411a to 411d and 412a to 412d for characters "e," "r," "d," and "f" in enlarged views in the QWERTY keyboards 401 and 402. The character input screen in portrait screen display corresponds to the first input screen of the present invention, and the character input screen in landscape screen display corresponds to the second input screen of the present invention.

In FIGS. 4A and 4B, the QWERTY keyboards 401 and 402 (hereinafter, referred to simply as "keyboards") are formed by character keys 411 and 412 for inputting the alphabet, delete keys 421 and 422 for deleting input characters, and other keys related to text creation. The QWERTY keyboards 401 and 402 have a larger number of keys arranged in the horizontal direction than those arranged in the vertical direction.

Reference numeral P1 denotes a pitch between centers of two character keys 411 adjacent to each other in the horizontal direction (X-axis direction) in the keyboard 401 in portrait screen display, for example, the "e" key 411a and the "r" key 411b. Reference numeral P2 denotes a pitch between centers of two character keys 411 adjacent to each other in the vertical direction (Y-axis direction) in the keyboard 401 in portrait screen display, for example, the "e" key 411a and the "d" key 411c.

Reference numeral P3 denotes a pitch between centers of two character keys 412 adjacent to each other in the horizontal direction (X-axis direction) in the keyboard 402 in landscape screen display, for example, the "e" key 412a and the "r" key 412b. Reference numeral P4 denotes a pitch between centers of two character keys 412 adjacent to each other in the vertical direction (Y-axis direction) in the keyboard 402 in landscape screen display, for example, the "e" key 412a and the "d" key 412c.

As shown in FIG. 4A, the keyboard 401 in portrait screen display has a larger number of keys along the shorter side of the display 11. Accordingly, the character keys 411, for example, the "e" key 411a, the "r" key 411b, the "d" key 411c, and the "f" key 411d are each formed in a rectangular shape with a horizontal side shorter than a vertical side.

Therefore, a pitch P1 between centers of the "e" key 411a and the "r" key 411b, that is, character keys 411 horizontally adjacent to each other in the keyboard 401 in portrait screen display, is extremely small. In contrast to this, a pitch P2 between centers of the "e" key 411a and the "d" key 411c, that is, character keys 411 vertically adjacent to each other in the keyboard 401, is relatively large.

As shown in FIG. 4B, the keyboard 402 in landscape screen display has a larger number of keys arranged along the longer side of the display 11. Accordingly, the character keys 412, for example, the "e" key 412a, the "r" key 412b, the "d" key 412c, and the "f" key 412d are each formed in a rectangular shape with a horizontal side longer than a vertical side.

Therefore, a pitch P3 between centers of the "e" key 412a and the "r" key 412b, that is, character keys 412 horizontally adjacent to each other in the keyboard 402 in landscape screen display, is relatively large. In contrast to this, a pitch P4 between centers of the "e" key 412a and the "d" key 412c, that is, character keys 412 vertically adjacent to each other in the keyboard 402, is smaller than the pitch P3. However, the pitch P4 between centers of character keys 412 vertically adjacent to each other in the keyboard 402 is made larger than the pitch P1 between centers of character keys 411 horizontally adjacent to each other in the keyboard 401.

When the keyboard 401 in portrait screen display is compared to the keyboard 402 in landscape screen display, the horizontal pitch P1 between the character keys 411 in the keyboard 401 is significantly smaller than the horizontal pitch P3 between the character keys 412 in the keyboard 402. Meanwhile, the vertical pitch P4 between the character keys 412 in the keyboard 402 is smaller than the vertical pitch P2 between the character keys 411 in the keyboard 401, but is not smaller than the horizontal pitch P1 between the character keys 411.

Therefore, in the case of inputting characters from the keyboard 401, a user is likely to press a character key 411 adjacent to a desired character key 411 by mistake, as compared to the case of inputting characters from the keyboard 402. Accordingly, a user may repeatedly perform incorrect input of characters during text creation.

In the cellular phone 1 according to this embodiment, it is possible to prevent a user's repeated incorrect input by executing a recurrence prevention control process according to an example described below.

EXAMPLE

Figure 5:
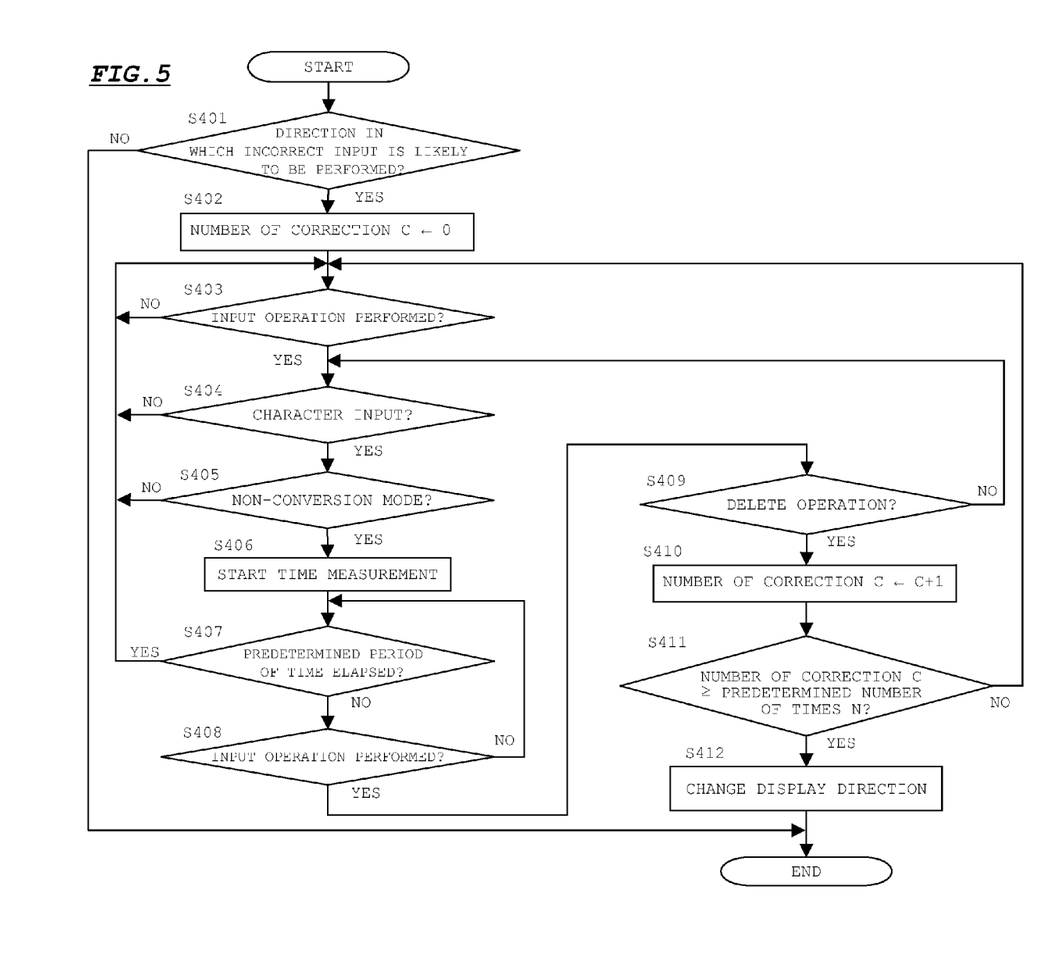
FIG. 5 is a flowchart of a recurrence prevention control process for preventing repeated incorrect input of characters according to the embodiment.

FIG. 5 is a flowchart showing a flow of a recurrence prevention control process for preventing repeated incorrect input of characters according to an example. FIGS. 6A to 6F are diagrams for describing a series of steps at which the display direction of the character input screen is changed by the recurrence prevention control process according to the example.

Referring to FIG. 5, when the character input screen is displayed on the display 11, the CPU 100 determines whether the display direction of the character input screen makes a user more likely to input incorrect characters (S401). For example, as described above with reference to FIGS. 4A and 4B, in the case the QWERTY keyboard 401 is arranged on the character input screen, when the display direction of the character input screen on the cellular phone 1 is vertical as shown in FIG. 4A, the CPU 100 determines that the direction makes a user more likely to input incorrect characters.

When the display direction of the character input screen does not make a user more likely to perform incorrect input (S401: NO), there is a low possibility that incorrect character input is repeatedly performed, and thus the recurrence prevention control process is terminated.

Meanwhile, when it is determined that the display direction of the character input screen makes a user more likely to input incorrect characters (S401: YES), the CPU 100 sets the number of correction at "0" (S402).

Next, when an input operation is performed on the QWERTY keyboard 401 (S403: YES), the CPU 100 determines whether the input is character input or not (S404). When the input is character input (S404: YES), the CPU 100 then determines whether the input is performed in a non-conversion mode or not (in which input characters are accepted as a definitive state without being changed) (S405).

When it is determined that the input is performed in the non-conversion mode (S405: YES), the CPU 100 starts to measure time (S406).

The CPU 100 determines whether a delete operation has been performed by steps S407, S408, and S409 before lapse of a predetermined period of time. The "delete operation" refers to pressing down the delete key 421 included in the keyboard 401, for example. The "predetermined period of time" refers to a period of time taken for, when any character is deleted by the delete operation, determining whether the deletion is made due to incorrect input.

After characters are input in a definitive state, in the case the delete operation is performed before lapse of the predetermined period of time (S407: NO, S408: YES, S409: YES), the number of corrections C is incremented (S410). When the number of corrections C reaches a predetermined number of times N (S411: YES), the display direction of the character input screen is changed (S412). Accordingly, the character input screen is switched from portrait to landscape orientations while the cellular phone 1 remains in portrait orientation. After that, the display direction is fixed even if the cellular phone 1 is changed in posture until the character input screen is closed by user operation.

Meanwhile, when the predetermined period of time has elapsed without any input operation performed (S407: YES), the process returns to step S403 and the CPU 100 waits for a new input operation. In addition, when the input operation performed before lapse of the predetermined period of time is not a delete operation (S409: NO), the process returns to step S404 and the CPU 100 determines whether the input operation is character input.

As in the foregoing, as a result of the determination on lapse of the time since the character input, even if the delete operation is performed after the character input, the number of corrections C is not incremented as far as the delete operation is performed after lapse of the predetermined period of time. In the case a long time is taken from input of characters to deletion of the characters, there is a high possibility that a user has deleted the characters not for correction of incorrect input but for replacement of the characters with different characters. Accordingly, in this example, the number of corrections C is not incremented in the case the deletion of characters is performed after lapse of the predetermined period of time since input of the characters.

Figure 6A:
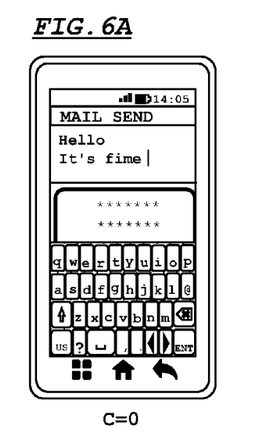
FIGS. 6A to 6F are diagrams for describing a series of steps at which a display direction of a character input screen is changed by the recurrence prevention control process according to the embodiment.
Figure 6B:
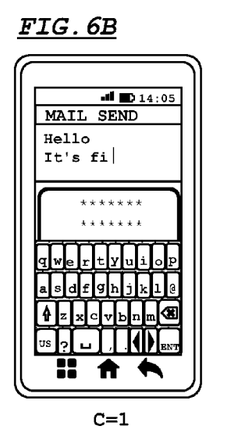
Figure 6C:
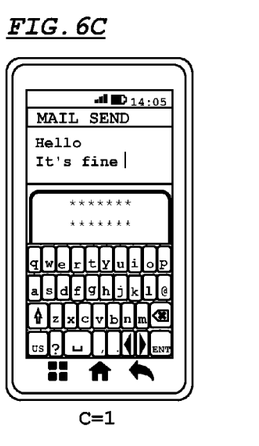

As shown in FIG. 6A, for example, if, at creation of e-mail text in portrait screen display, a user inputs "me" by mistake instead of "ne" following the phrase "Hello It's fi" and creates an incorrect sentence "Hello It's fime," the user detects the incorrect input and deletes the characters "me" to return to "Hello It's fi" as shown in FIG. 6B. Accordingly, the predetermined number of times C is incremented from "0" to "1." After that, the user inputs correct characters "ne" as shown in FIG. 6C.

Figure 6D:
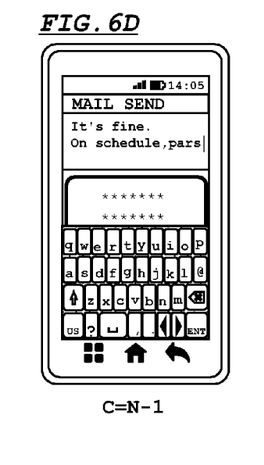
Figure 6E:
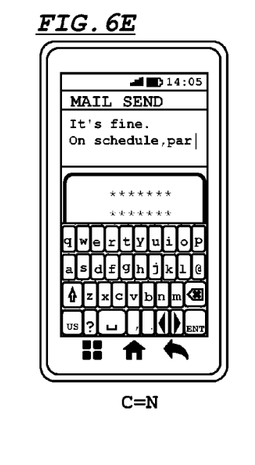
Figure 6F:
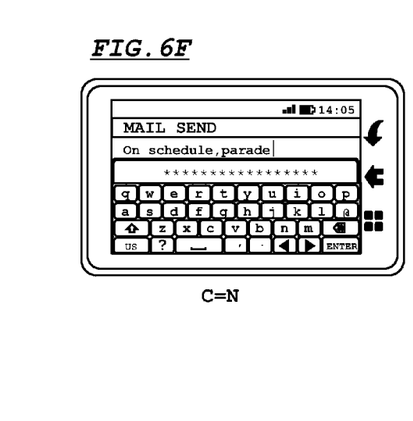

Since the pitch between the character keys 411 adjacent to each other in the horizontal direction is small, if the user repeats incorrect input, the number of corrections C finally reaches the predetermined number of times N when the user deletes incorrectly input characters as shown in FIGS. 6D and 6E. Accordingly, the character input screen is switched from portrait to landscape orientation while the cellular phone 1 remains in portrait orientation. The user thus changes the cellular phone 1 to landscape orientation to perform correct character input as shown in FIG. 6F.

As in the foregoing, when the display direction of the character input screen is changed, the recurrence prevention control process is terminated. In addition, the recurrence prevention control process is also terminated when the character input screen is closed before the display direction of the character input screen is changed. Besides, the recurrence prevention control process is also terminated when the posture of the cellular phone 1 is switched from portrait to landscape orientation and the display direction of the character input screen is changed according to the posture switching and the character input screen is switched from portrait to landscape orientation. In this case, when the posture of the cellular phone 1 is switched again to portrait orientation and the character input screen is set in portrait orientation, the recurrence prevention control process is started again.

As in the foregoing, according to the example, when the character input screen is displayed in portrait orientation, if a condition for changing, including deletion of characters input in a definitive state by the delete key 421, is fulfilled, the display direction of the character input screen is changed from portrait orientation to landscape orientation in which the intervals between the keys in the keyboard 402 are larger than those in the portrait orientation. Accordingly, it is unlikely that a user presses a character key 412 adjacent to a desired character key 412 by mistake. This makes it possible to prevent a user from performing repeated incorrect input.

In addition, according to the example, it is determined whether the deletion of characters input in a definitive state is made due to incorrect input, based on the time elapsed since the instant when the characters are input to the instant when the delete key 421 is pressed. In the case the time elapsed is short and there is a high possibility that the deletion is made due to incorrect input, it is determined that a condition for changing is fulfilled and the number of corrections C is incremented. Accordingly, it is possible to prevent that the display direction of the character input screen is changed even though no incorrect input is performed.

Further, according to the example, the display direction of the character input screen is changed when the number of corrections C of the condition for changing reaches the predetermined number of times N. Accordingly, it is possible to prevent that the display direction of the character input screen is changed when not so many incorrect input are performed.

Modification Example

Figure 7A:
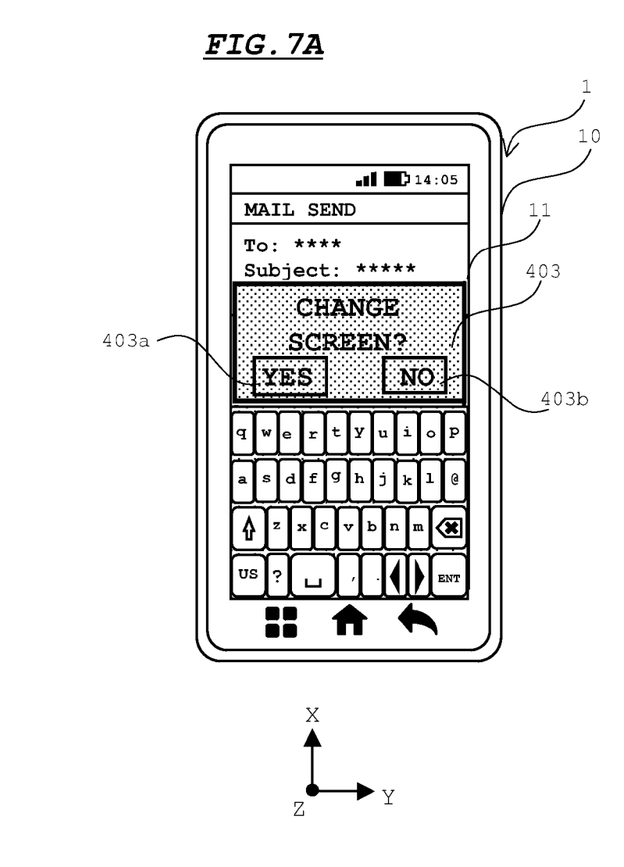
FIGS. 7A and 7B are diagrams showing transition of the character input screen on execution of the recurrence prevention control process according to the embodiment.
Figure 7B:
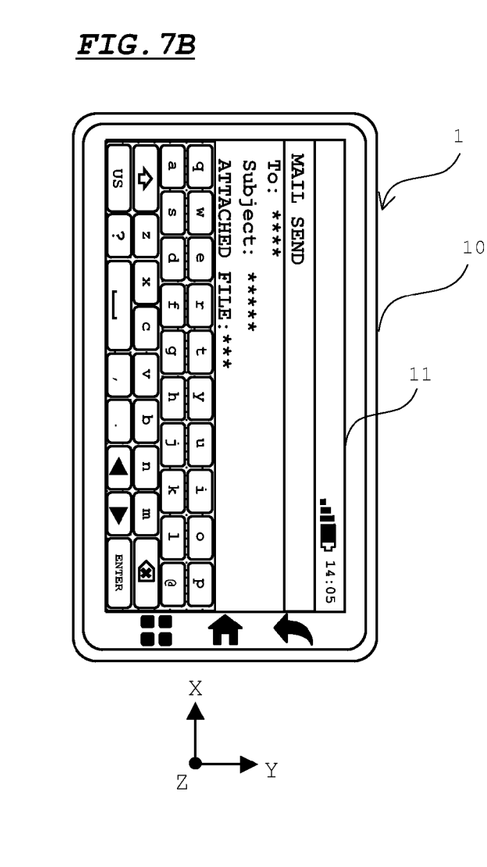

FIGS. 7A and 7B are diagrams showing transition of the character input screen at execution of the recurrence prevention control process according to the embodiment.

In the foregoing example, the display direction of the character input screen in the cellular phone 1 is automatically changed. In contrast to this, in this modification example, when a condition for changing the display direction is fulfilled, a confirmation window 403 is displayed to ask a user to determine whether the display direction to be changed and perform the operation.

When determining that the number of corrections C has reached the predetermined number of times N, the CPU 100 displays the confirmation window 403 on the character input screen as shown in FIG. 7A to allow the user to select change of the display direction of the character input screen. The confirmation window 403 has a "YES" key 403*a* and a "NO" key 403*b*.

After that, the CPU 100 determines whether the user has selected change of the display direction of the character creation screen in the confirmation screen. In the case the user presses the "YES" key 403*a* to select change of the display direction, the display direction of the character input screen is changed such that the character input screen is switched from portrait to landscape orientation while the cellular phone 1 remains in portrait orientation, as shown in FIG. 7B. On the other hand, in the case the user presses the "NO" key 403*b* so as not to select change of the display direction, the display direction of the character input screen is not changed but remains in portrait orientation.

As in the foregoing, according to the configuration of this modification example, the user can select change of the display direction of the character input screen at his/her own discretion.

Others

As in the foregoing, the embodiment is described. However, the present invention is not limited to the foregoing embodiment. In addition, the embodiment of the present invention can be modified in various manners besides the foregoing manner.

For example, in the foregoing embodiment, it is determined whether the predetermined period of time has elapsed after character input, and in the case the delete operation is performed before lapse of the predetermined period of time, the number of corrections C is incremented. However, the determination on lapse of the predetermined period of time may not be necessarily performed, and the number of corrections C maybe incremented when the delete operation is performed after character input or a confirmation operation.

Further, in the foregoing embodiment, the QWERTY keyboards 401 and 402 are arranged as examples in the character input screen. However, any keyboard other than these keyboards may be arranged in the character input screen. The keyboard is only required to make the user less likely to perform incorrect input in one of portrait and landscape orientations than in the other orientation because the intervals between adjacent character keys vary according to the display direction of the character input screen.

In the foregoing embodiment, the QWERTY keyboards 401 and 402 include the delete keys 421 and 422. That is, the delete keys are software keys displayed on the display 11. However, the delete keys are not limited to this and may be provided as hardware keys located in places other than on the display 11.

Further, in the foregoing embodiment, the present invention is applied to a so-called straight-type cellular phone (smartphone). However, the present invention is not limited to this and may be applied to any other type of cellular phone such as a so-called folding type and a sliding type.

Moreover, the mobile terminal device of the present invention is not limited to a cellular phone and may be a PDA (personal digital assistant), a tablet PC, an electronic book terminal, or the like.

Besides, the embodiment of the present invention can be modified as appropriate in various manners within the scope of technical ideas disclosed in the claims.

What is claimed is:

1. A mobile terminal device comprising:
    a display surface;
    a display control module configured to display on the display surface, in a switchable manner, an input screen, in a first orientation, with a plurality of character keys which input characters, and the input screen, in a second orientation that is in a different direction than the first orientation, with the plurality of character keys having larger intervals between at least some of adjacent character keys than intervals between all of adjacent character keys of the input screen in the first orientation; and
    a delete key which deletes a character input by one of the plurality of character keys,
    wherein, when the input screen is displayed on the display surface, the display control module,
        when a condition including deletion of a character by the delete key is not fulfilled, displays the input screen in an orientation that matches an orientation of the display surface, and,
        when the condition is fulfilled, displays the input screen in the second orientation even when the display surface is in the first orientation until the input screen is closed, and, once the input screen is closed, displays another screen in an orientation that matches an orientation of the display surface.

2. The mobile terminal device according to claim 1, wherein the condition for changing includes deletion of a character by the delete key before lapse of a predetermined period of time since input of the character.

3. The mobile terminal device according to claim 1, wherein the condition includes a predetermined number of deletions of characters by the delete key.

4. A non-transitory computer-readable storage medium holding a computer program, wherein the computer program causes a computer of a mobile terminal device, including a display surface and an acceptance module which accepts an input into the display surface, to:
    display an input screen, in a first orientation, with a plurality of character keys for inputting characters or display the input screen, in a second orientation that is in a different direction than the first orientation, with the plurality of character keys having larger intervals between at least some of adjacent character keys than intervals between all of adjacent character keys of the input screen in the first orientation;
    when a condition including deletion of a character by a delete key is not fulfilled, display the input screen in an orientation that matches an orientation of the display surface; and,
    when the condition is fulfilled, display the input screen in the second orientation even when the display surface is in the first orientation until the input screen is closed, and, once the input screen is closed, display another screen in an orientation that matches an orientation of the display surface.

5. A display control method in a mobile terminal device with a display surface, the method comprising:
    displaying an input screen, in a first orientation, with a plurality of character keys which input characters or display the input screen, in a second orientation that is in a different direction than the first orientation, with the plurality of character keys having larger intervals between at least some of adjacent character keys than intervals between all of adjacent character keys of the input screen in the first orientation;

when a condition including deletion of a character by a delete key is not fulfilled, displaying the input screen in an orientation that matches an orientation of the display surface; and, when the condition is fulfilled, displaying the input screen in the second orientation even when the display surface is in the first orientation until the input screen is closed, and, once the input screen is closed, displaying another screen in an orientation that matches an orientation of the display surface.

6. The mobile terminal device according to claim 1, wherein the first orientation is portrait orientation and the second orientation is landscape orientation.

\* \* \* \* \*